(12) United States Patent
O'Daniel et al.

(10) Patent No.: US 7,188,023 B1
(45) Date of Patent: Mar. 6, 2007

(54) MISFIRE DETECTION SYSTEM FOR DISPLACEMENT ON DEMAND (DOD) ENGINE

(75) Inventors: Gregory F. O'Daniel, Davisburg, MI (US); David S. Mathews, Howell, MI (US); Douglas J. Moening, Farmington, MI (US); Tameem K. Assaf, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/260,876

(22) Filed: Oct. 27, 2005

(51) Int. Cl.
*F02P 5/152* (2006.01)
*G01L 23/22* (2006.01)

(52) U.S. Cl. .................. 701/111; 123/406.14

(58) Field of Classification Search ............... 701/111, 701/105, 107, 114; 123/322–335, 90.11–90.18, 123/406.14, 406.45, 339.11, 339.19, 673, 123/198 F; 60/274, 276, 299
See application file for complete search history.

(56) References Cited

U.S. PATENT DOCUMENTS

| | | | | |
|---|---|---|---|---|
| 5,460,129 A * | 10/1995 | Miller et al. | ............. | 123/90.15 |
| 6,752,121 B2 * | 6/2004 | Rayl et al. | ............. | 123/198 F |
| 6,820,597 B1 * | 11/2004 | Cullen et al. | ............. | 123/520 |
| 6,843,229 B2 * | 1/2005 | Bauerle et al. | ............. | 123/396 |
| 7,019,414 B2 * | 3/2006 | Albertson et al. | ........ | 290/40 B |

* cited by examiner

*Primary Examiner*—Willis R. Wolfe, Jr.
*Assistant Examiner*—Johnny H. Hoang
(74) *Attorney, Agent, or Firm*—Christopher DeVries

(57) ABSTRACT

A cylinder misfire control system for a displacement on demand (DOD) engine that is operable in an activated mode and a deactivated mode includes a sensor that is responsive to rotation of a crankshaft of the engine and a first module that calculates a time derivative based on a first time period associated with a first deactivated cylinder and a second time period associated with a second deactivated cylinder. The first and second time periods are based on the rotation of the crankshaft. A second module detects a misfire occurrence in an activated cylinder based on the time period derivative.

28 Claims, 4 Drawing Sheets

MISFIRE DETECTION SYSTEM FOR DISPLACEMENT ON DEMAND (DOD) ENGINE

FIELD OF THE INVENTION

The present invention relates to engine misfire detection, and more particularly to engine misfire detection in a displacement on demand (DOD) engine.

BACKGROUND OF THE INVENTION

Internal combustion engines create drive torque that is transferred to a drivetrain via a crankshaft. Some internal combustion engines include engine control systems that deactivate cylinders under low load situations. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

During engine operation a cylinder or cylinders may misfire. After a misfire occurs, the engine RPM decelerates until other firing cylinders produce enough power to stabilize the engine. During the activated mode, the engine behaves in this manner, but only to a limited extent since the cylinder after a misfiring cylinder is also active and is doing work. During the deactivated mode, the cylinder that is after a misfiring cylinder also does not fire because it is deactivated.

Traditional misfire detection systems do not account for the deactivated cylinders. As a result, false misfires can be detected, which result in increased warranty costs, increase the complexity in analyzing an actual cylinder misfire and detracts from overall vehicle performance and customer satisfaction.

SUMMARY OF THE INVENTION

Accordingly, the present invention provides a cylinder misfire control system for a displacement on demand (DOD) engine that is operable in an activated mode and a deactivated mode. The cylinder misfire control system includes a sensor that is responsive to rotation of a crankshaft of the engine and a first module that calculates a time derivative based on a first time period associated with a first deactivated cylinder and a second time period associated with a second deactivated cylinder. The first and second time periods are based on the rotation of the crankshaft. A second module detects a misfire occurrence in an activated cylinder based on the time period derivative.

In one feature, the first and second time periods are based on a time period required for the crankshaft to rotate through a predetermined angle.

In other features, the first module calculates the time derivative as a difference between the first time period and the second time period. The first deactivated cylinder is immediately prior to the activated cylinder in a pre-defined cylinder firing order. The activated cylinder is immediately prior to the second deactivated cylinder in a pre-defined cylinder firing order.

In still other features, the cylinder misfire control system further includes a third module that determines a derivative threshold. The misfire occurrence is detected when the time derivative exceeds the derivative threshold. The derivative threshold is determined based on an engine speed and engine load.

In yet other features, the second module associates the time derivative with the activated cylinder by adjusting a cylinder index that corresponds to a predetermined firing order of the cylinders. The adjusting includes shifting the cylinder index back one cylinder in the firing order.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
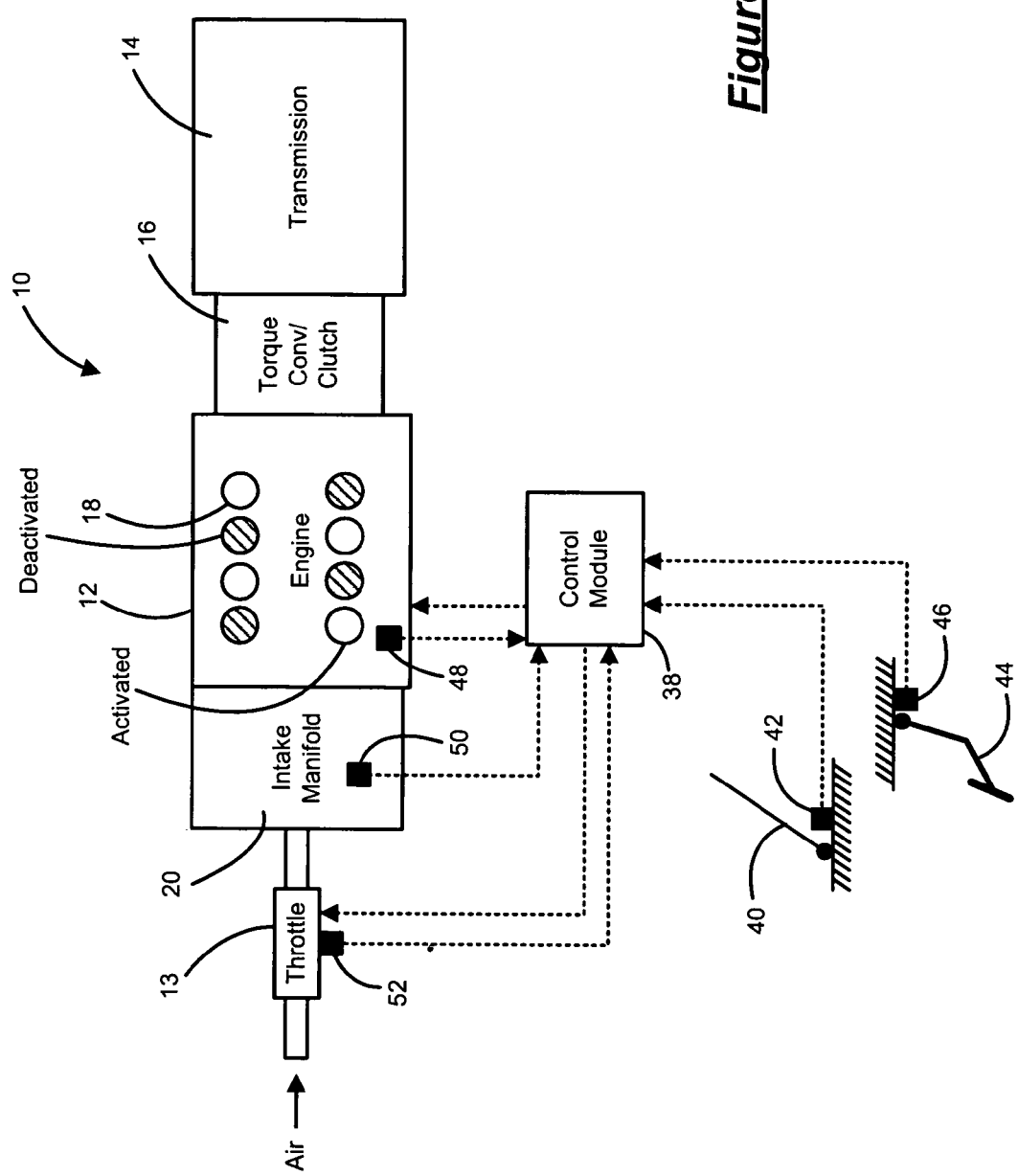
FIG. 1 is a functional block diagram of an exemplary engine system that includes a displacement on demand (DOD) engine and that implements the cylinder misfire detection control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, activated refers to operation using all of the engine cylinders. Deactivated refers to operation using less than all of the cylinders of the engine (one or more cylinders not active).

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more of the cylinders 18 are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The combustion process reciprocally drives pistons (not shown) within the cylinders 18. The pistons rotatably drive a crankshaft 30 to provide drive torque to the powertrain.

A control module 38 communicates with the engine 12 and various inputs and sensors as described herein. A vehicle operator manipulates an accelerator pedal 40 to regulate the throttle 13. More particularly, a pedal position sensor 42 generates a pedal position signal that is communicated to the control module 38. The control module 38 generates a throttle control signal based on the pedal position signal. A throttle actuator (not shown) adjusts the throttle 13 based on the throttle control signal to regulate air flow into the engine 12.

The vehicle operator manipulates a brake pedal 44 to regulate vehicle braking. More particularly, a brake position sensor 46 generates a brake pedal position signal that is communicated to the control module 38. The control module 38 generates a brake control signal based on the brake pedal position signal. A brake system (not shown) adjusts vehicle braking based on the brake control signal to regulate vehicle speed. An intake manifold absolute pressure (MAP) sensor 50 generates a signal based on a pressure of the intake manifold 20. A throttle position sensor (TPS) 52 generates a signal based on throttle position.

An engine speed sensor 48 generates a signal based on engine speed. More specifically, the engine includes an engine speed mechanism (not shown), to which the engine speed sensor 48 is responsive. In one example, the engine speed mechanism includes a toothed wheel that is fixed for rotation with the crankshaft 30. The engine speed sensor 48 is responsive to the rising and falling edges of the teeth. An exemplary toothed wheel includes 59 teeth that are equally spaced about the circumference of the wheel, except in one location where a tooth is missing to provide a gap. Therefore, the gap is approximately twice the distance of the normal space between adjacent teeth. In this manner, each tooth accounts for approximately 6° of crankshaft rotation. The control module 38 determines the engine RPM based on the time it takes for a pre-determined number of teeth to pass.

When light engine load occurs, the control module 38 transitions the engine 12 to the deactivated mode. In an exemplary embodiment, N/2 cylinders 18 are deactivated, although one or more cylinders may be deactivated. Upon deactivation of the selected cylinders 18, the control module 38 increases the power output of the remaining or activated cylinders 18. The inlet and exhaust ports (not shown) of the deactivated cylinders 18 are closed to reduce pumping losses. The engine load is determined based on the intake MAP, cylinder mode and engine speed. More particularly, if the MAP is below a threshold level for a given RPM, the engine load is deemed light and the engine 12 is operated in the deactivated mode. If the MAP is above the threshold level for the given RPM, the engine load is deemed heavy and the engine 12 is operated in the activated mode.

The cylinder misfire detection control of the present invention is based on crankshaft speed fluctuation. More specifically, the misfire detection control monitors a time period (t[N], where N is the cylinder number associated with the time period) that reflects the amount of time it takes for the crankshaft 30 to rotate a pre-determined angle. For example, the pre-determined angle can be 90°, which is equal to 15 teeth for the exemplary 58 teeth, toothed wheel described above. The control module 38 consistently monitors t[N]. t[N] is centered on the compression event of the particular cylinder (N). The loss of power due to a misfire is reflected in the compression of the next cylinder (N+1). More specifically, the power stroke of one cylinder is intended to drive the compression stroke of the next cylinder.

Parallel to the continuous monitoring of t[N] values, the cylinder misfire detection control calculates differentials or derivatives ($\Delta[N]$). The derivative is calculated and references the time period of an activated cylinder to the previous activated cylinder and a deactivated cylinder to the previous deactivated cylinder. The derivative term is calculated in accordance with the following relationship:

$$\Delta[N]=t[N]-t[N-2]$$

For example, if cylinder N is an deactivated cylinder, then cylinder N−2 is a previous deactivated cylinder, whereas cylinder N−1 is a previous activated cylinder. The cylinder misfire detection identifies the two highest deactivated cylinder derivatives or peaks ($\Delta_{1HI}$ and $\Delta_{2HI}$, respectively) in addition to their corresponding cylinder indices.

After a misfire takes place in an active cylinder, the engine starts to decelerate until other active cylinders begin to produce enough power to stabilize the engine. During normal operation (i.e., in the activated mode), the cylinder after misfire behaves this way, but only to a limited extent since this cylinder is still active. During operation in the deactivated mode, when a misfire takes place in an active cylinder, the deactivated cylinder derivative following the misfiring cylinder exhibits a high derivative value relative to its non-misfiring counterparts. This so-called cylinder-after effect is more pronounced in the deactivated mode because the deactivated cylinder after a misfiring activated cylinder is also not doing any work.

Because the deactivated cylinder is one cylinder behind the misfiring active cylinder, the cylinder misfire detection control adjusts the cylinder index prior to the misfire determination. This adjustment is done by subtracting one from a particular index value, with roll over protection such that a zero value index would be adjusted to the largest index (i.e., highest cylinder number) for a given engine application. In this manner, the derivative value for a deactivated cylinder is associated with the activated cylinder immediately prior.

The cylinder misfire detection control determines a threshold derivative value ($\Delta_{THR}$) based on engine RPM and load. For example, $\Delta_{THR}$ can be determined from a look-up table or can be calculated by processing the engine speed and load through an equation. $\Delta_{1HI}$ and $\Delta_{2HI}$ are compared to $\Delta_{THR}$. If one of $\Delta_{1HI}$ and $\Delta_{2HI}$ exceeds $\Delta_{THR}$, a misfire has occurred in the associated active cylinder.

The cylinder misfire detection control monitors cylinder misfire and executes a corrective action based on a misfire occurrence frequency ($f_{OCC}$). If $f_{OCC}$ is high enough (i.e., above a first threshold) to adversely affect the desired emissions performance, the misfire data is stored and the misfiring cylinder or cylinders are flagged in the control module 38. If $f_{OCC}$ is persistently high (i.e., above a second threshold), a service alarm is initiated (e.g., a malfunction indicator light (MIL) is illuminated). If $f_{OCC}$ is high enough (i.e., above a third threshold) to cause damage to exhaust treatment components (e.g., a catalytic converter), the above-discussed actions are executed, along with additional alert and/or remedial actions (e.g., flashing of the MIL).

Figure 2:
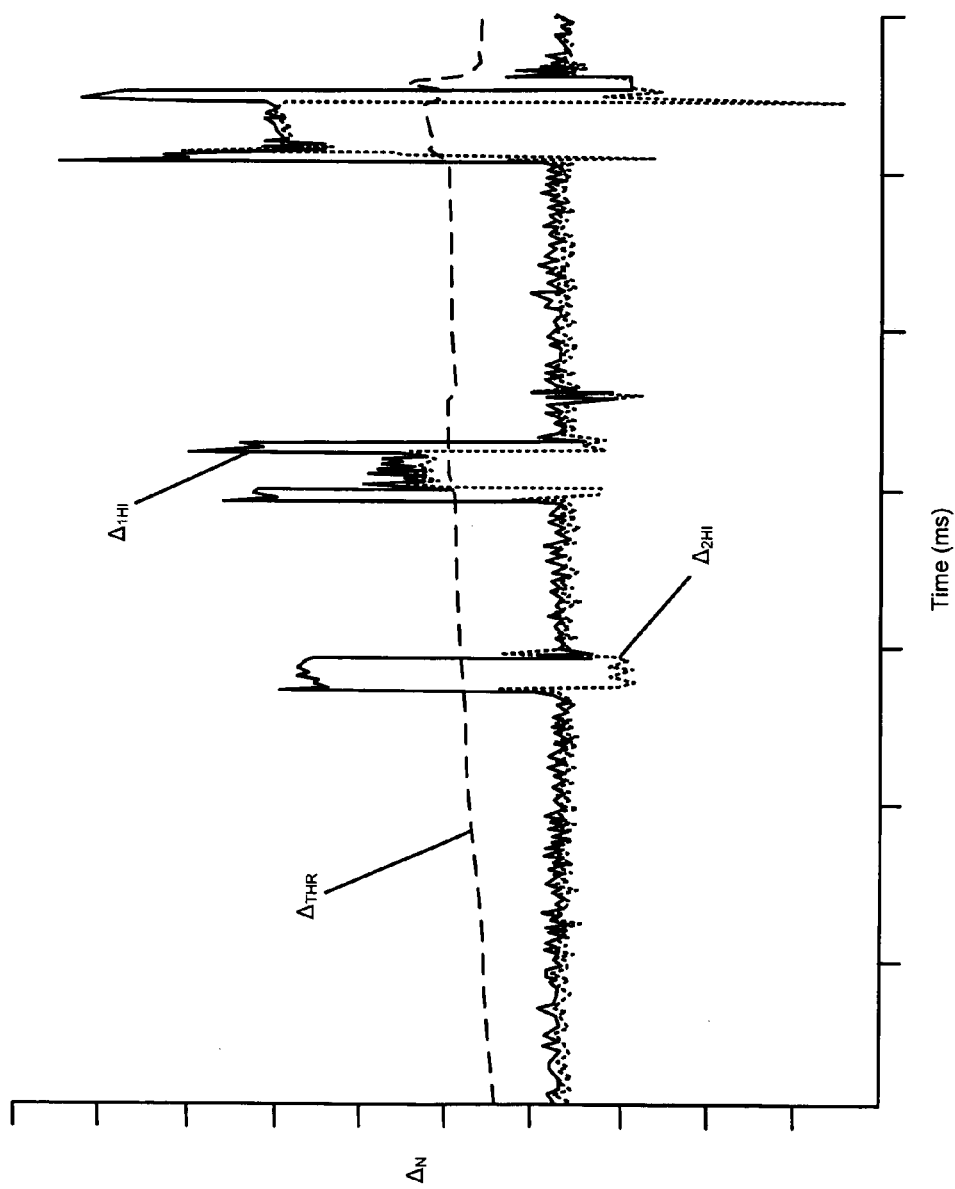
FIG. 2 is a graph illustrating exemplary differential traces for engine cylinders having the two highest differential peaks.

Referring now to FIG. 2, a graph illustrates exemplary derivative traces for first and second cylinders. The derivative traces are based on deactivated cylinder data, but are associated with the previous activated cylinder via the cylinder index adjustment. More specifically, although the derivative traces identify which active cylinder is misfiring, the data actually collected corresponds to a deactivated cylinder. The exemplary traces indicate a misfire in each of the corresponding active cylinders.

Figure 3:
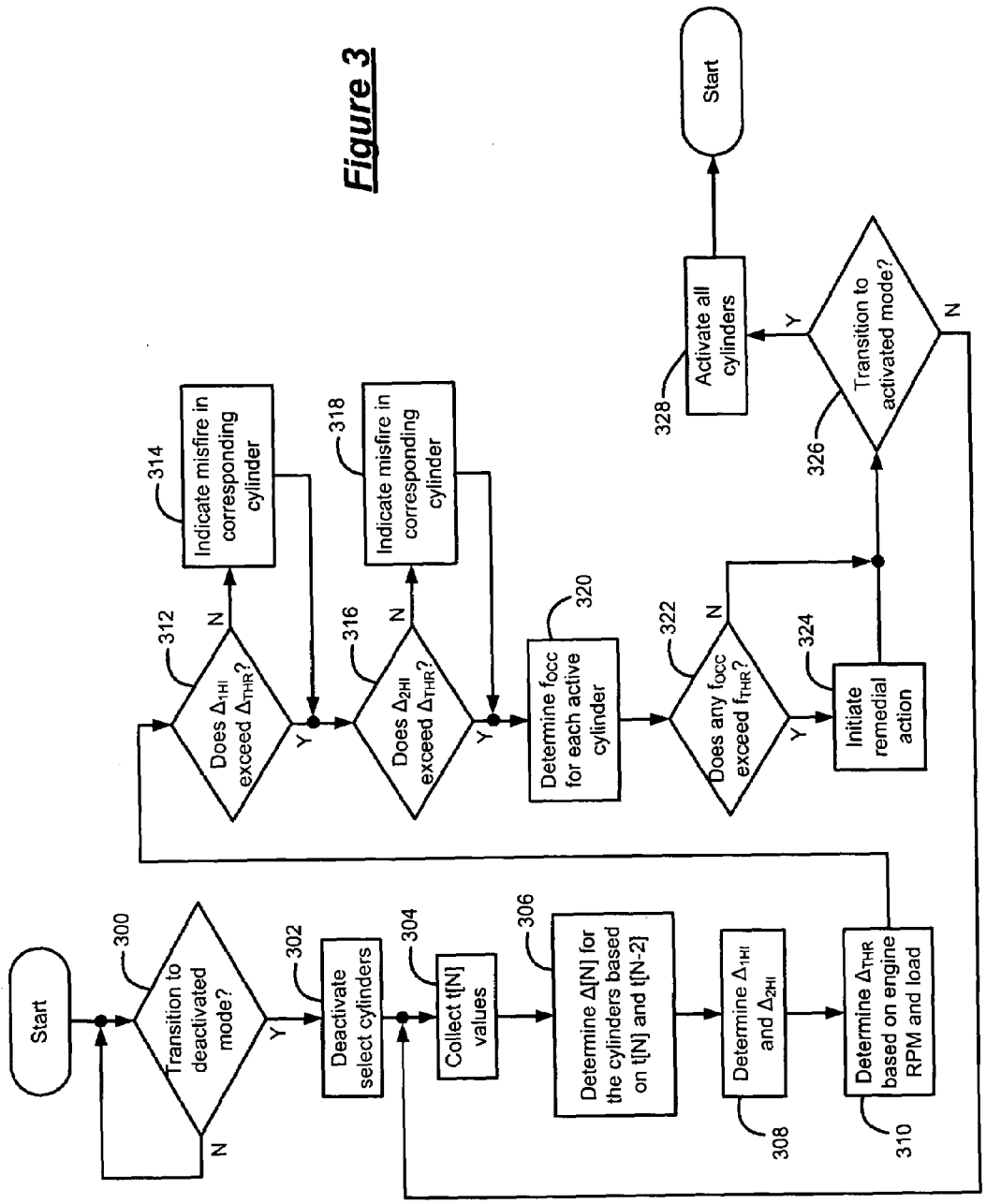
FIG. 3 is a flowchart illustrating exemplary steps executed by the cylinder misfire detection control according to the present invention.

Referring now to FIG. 3, exemplary steps executed by the cylinder misfire detection will be described in detail. In step 300, control determines whether to transition into the deactivated mode. If control does not determine not to transition into the deactivated mode, control loops back. If control does determine to transition to the deactivated mode, control deactivates the select cylinders in step 302.

In step 304, control collects t[N] values for the activated and deactivated cylinders. Control determines Δ[N] for the cylinders based on their respective t[N] and t[N−2] values in step 306. In step 308, control determines $\Delta_{1HI}$ and $\Delta_{2HI}$ based on the Δ[N] values of the cylinders. Control determines $\Delta_{THR}$ based on engine RPM and load in step 310. In step 312, control determines whether $\Delta_{1HI}$ exceeds $\Delta_{THR}$. If $\Delta_{1HI}$ exceeds ATHR, control indicates a misfire in the corresponding cylinder in step 314 and continues in step 316. If $\Delta_{1HI}$ does not exceed ATHR, control determines whether $\Delta_{1HI}$ exceeds $\Delta_{THR}$ in step 316. If $\Delta_{2HI}$ exceeds $\Delta_{THR}$, control indicates a misfire in the corresponding cylinder in step 318 and continues in step 320. If $\Delta_{1HI}$ does not exceed ATHR, control updates $f_{OCC}$ for each activated cylinder in step 320.

In step 322, control determines whether any $f_{OCC}$ value exceeds a frequency threshold ($f_{THR}$). If $f_{OCC}$ exceeds $f_{THR}$, control initiates a remedial action, as discussed in detail above, and continues in step 326. Although a single frequency threshold is identified with regard to FIG. 3, it is appreciated that $f_{OCC}$ can be compared to a plurality of frequency thresholds to determine the type of remedial action to be initiated. If $f_{OCC}$ does not exceed $f_{THR}$, control determines wither to transition to the activated mode in step 326. If control does not determine not to transition into the activated mode, control loops back to step 304. If control does determine to transition to the activated mode, control activates all cylinders in step 304 and control ends.

Figure 4:
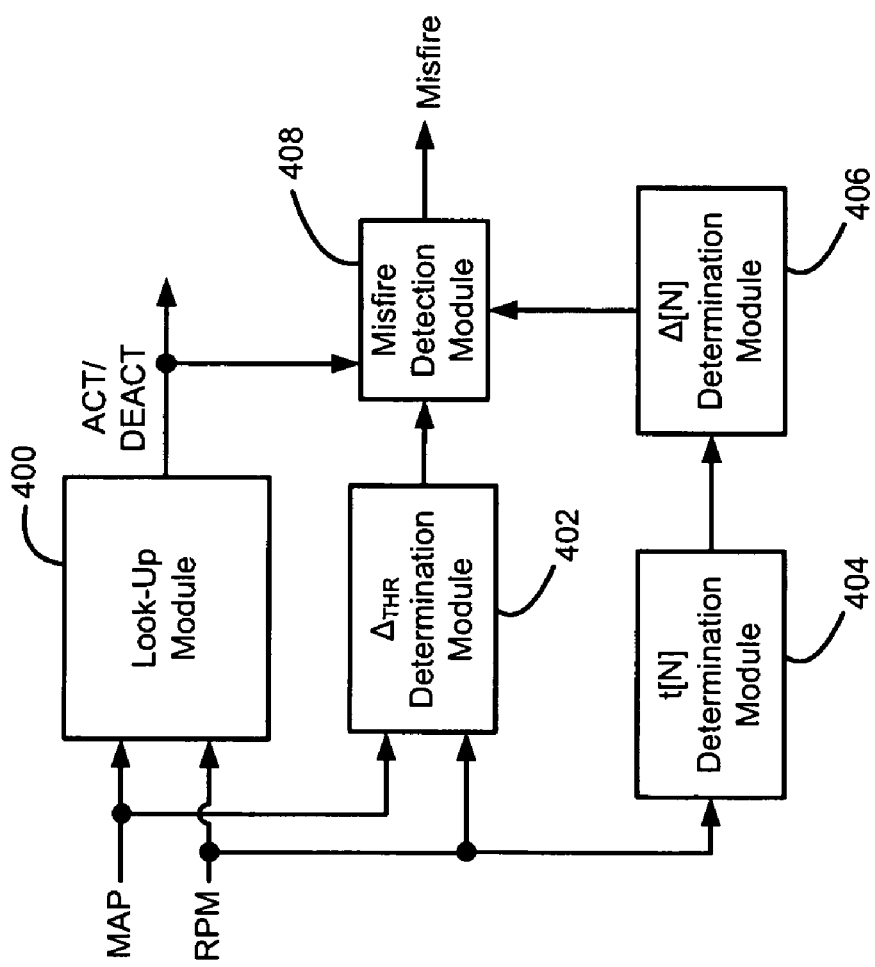
FIG. 4 is a functional block diagram of exemplary modules that execute the engine misfire detection control of the present invention.

Referring now to FIG. 4, exemplary modules that execute the cylinder misfire detection control will be described in detail. The exemplary modules include a look-up module 400, a $\Delta_{THR}$ determination module 402, a t[N] determination module 404, a Δ[N] determination module 406 and a misfire detection module 408. The look-up module 400 generates one of an activated (ACT) and a deactivated (DEACT) signal based on RPM and MAP to transition the engine between activated and deactivated modes.

The $\Delta_{THR}$ determination module 402 determines $\Delta_{THR}$ based on RPM and MAP and the t[N] determination module 404 determines t[N] based on RPM. The Δ[N] determination module 406 determines Δ[N] based on t[N] and t[N−2], which is based on the t[N] value calculated two cylinders ago. The misfire detection module 408 selectively generates a misfire indicated signal that is associated with a particular activated cylinder (e.g., cylinder N−1 in the case where cylinder N is a deactivated cylinder) based on Δ[N] and $\Delta_{THR}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A cylinder misfire control system for a displacement on demand (DOD) engine that is operable in an activated mode and a deactivated mode, comprising:
    a sensor that is responsive to rotation of a crankshaft of said engine;
    a first module that calculates a time derivative based on a first time period associated with a first deactivated cylinder and a second time period associated with a second deactivated cylinder, wherein said first and second time periods are based on said rotation of said crankshaft; and
    a second module that detects a misfire occurrence in an activated cylinder based on said time derivative.

2. The cylinder misfire control system of claim 1 wherein said first and second time periods are based on a time period required for said crankshaft to rotate through a predetermined angle.

3. The cylinder misfire control system of claim 1 wherein said first module calculates said time derivative as a difference between said first time period and said second time period.

4. The cylinder misfire control system of claim 3 wherein said first deactivated cylinder is immediately prior to said activated cylinder in a pre-defined cylinder firing order.

5. The cylinder misfire control system of claim 3 wherein said activated cylinder is immediately prior to said second deactivated cylinder in a pre-defined cylinder firing order.

6. The cylinder misfire control system of claim 1 further comprising a third module that determines a derivative threshold wherein said misfire occurrence is detected when said time derivative exceeds said derivative threshold.

7. The cylinder misfire control system of claim 6 wherein said derivative threshold is determined based on an engine speed and engine load.

8. The cylinder misfire control system of claim 1 wherein said second module associates said time derivative with said activated cylinder by adjusting a cylinder index that corresponds to a predetermined firing order of said cylinders.

9. The cylinder misfire control system of claim 8 wherein said adjusting comprises shifting said cylinder index back one cylinder in said firing order.

10. A method of detecting cylinder misfire in a displacement on demand (DOD) engine that is operable in an activated mode and a deactivated mode, comprising:
    monitoring rotation of a crankshaft of said engine;
    calculating a time derivative based on a first time period associated with a first deactivated cylinder and a second time period associated with a second deactivated cylinder, wherein said first and second time periods are associated with said rotation of said crankshaft; and
    detecting a misfire occurrence in an activated cylinder based on said time derivative.

11. The method of claim 10 wherein said first and second time periods are based on a time period required for said crankshaft to rotate through a predetermined angle.

12. The method of claim 10 wherein said time derivative is calculated as a difference between said first time period and said second time period.

13. The method of claim 12 wherein said first deactivated cylinder is immediately prior to said activated cylinder in a pre-defined cylinder firing order.

14. The method of claim 12 wherein said activated cylinder is immediately prior to said second deactivated cylinder in a pre-defined cylinder firing order.

15. The method of claim 10 further comprising determining a derivative threshold wherein said misfire occurrence is detected when said time derivative exceeds said derivative threshold.

16. The method of claim 15 wherein said derivative threshold is determined based on an engine speed and engine load.

17. The method of claim 10 further comprising associating said time derivative with said activated cylinder by adjusting a cylinder index that corresponds to a predetermined firing order of said cylinders.

18. The method of claim 17 wherein said adjusting comprises shifting said cylinder index back one cylinder in said firing order.

19. A method of detecting cylinder misfire in a displacement on demand (DOD) engine that is operable in an activated mode and a deactivated mode, comprising:
    monitoring rotation of a crankshaft of said engine;
    calculating time derivatives associated with deactivated cylinders of said engine;
    associating said time derivatives with respective activated cylinders that are immediately prior to each of said deactivated cylinders in a predetermined firing order; and
    detecting a misfire occurrence in each of said activated cylinders based on said time derivatives associated therewith.

20. The method of claim 19 wherein said time derivatives are each based on a respective first time period associated with a respective first deactivated cylinder and a respective second time period associated with a respective second deactivated cylinder, wherein said first and second time periods are associated with said rotation of said crankshaft.

21. The method of claim 20 wherein said first and second time periods are based on a time period required for said crankshaft to rotate through a predetermined angle.

22. The method of claim 20 wherein said time derivative is calculated as a difference between said first time period and said second time period.

23. The method of claim 20 wherein said first deactivated cylinder is immediately prior to said activated cylinder in a pre-defined cylinder firing order.

24. The method of claim 20 wherein said activated cylinder is immediately prior to said second deactivated cylinder in a pre-defined cylinder firing order.

25. The method of claim 19 further comprising determining a derivative threshold wherein said misfire occurrence is detected when said time derivative exceeds said derivative threshold.

26. The method of claim 25 wherein said derivative threshold is determined based on an engine speed and engine load.

27. The method of claim 19 wherein said associating said time derivatives with said activated cylinders includes adjusting a cylinder index that corresponds to said predetermined firing order of said cylinders.

28. The method of claim 27 wherein said adjusting comprises shifting said cylinder index back one cylinder in said firing order.

* * * * *